Nov. 6, 1928.  E. P. BULLARD, JR  1,690,567
POWER CHUCKING DEVICE
Filed Dec. 12, 1923   5 Sheets-Sheet 2

INVENTOR
*Edward P. Bullard, Jr.*
BY
*Chamberlain & Newman*
ATTORNEYS

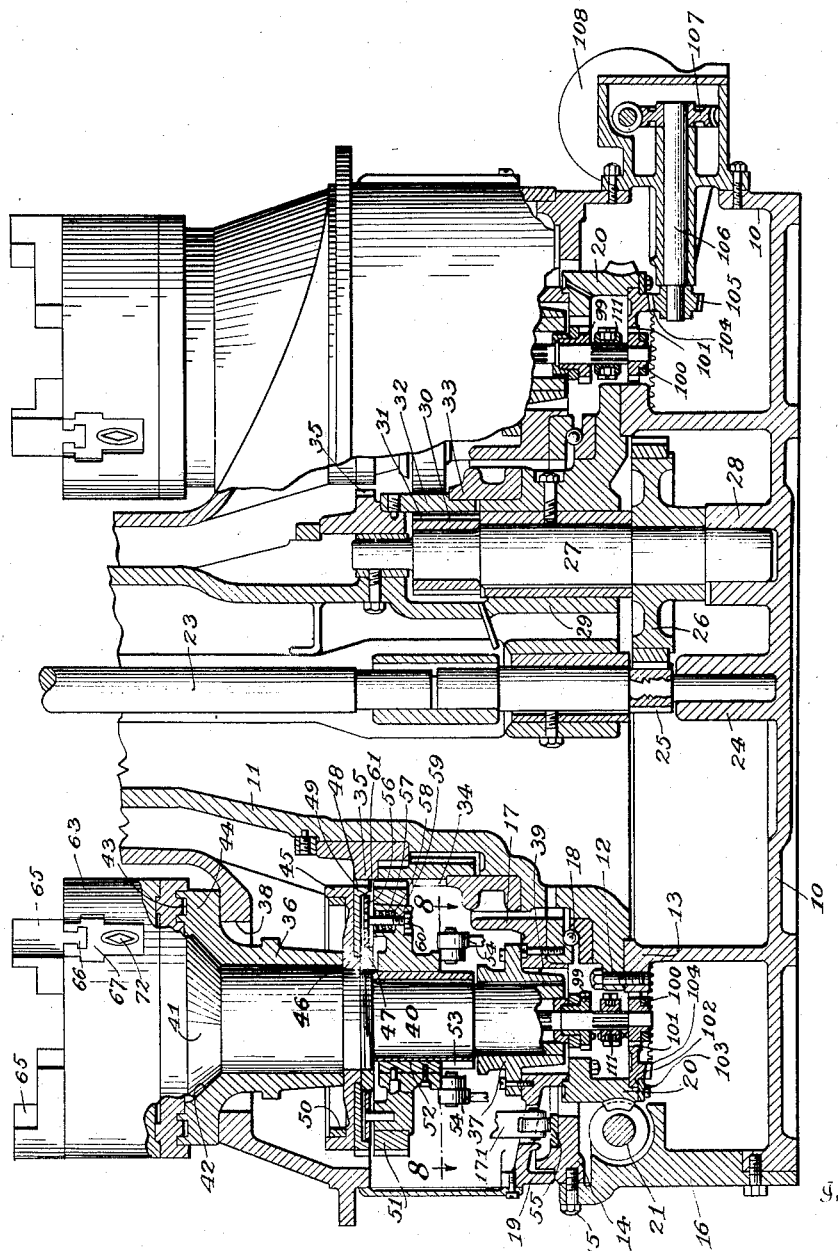

Nov. 6, 1928.

E. P. BULLARD, JR 1,690,567

POWER CHUCKING DEVICE

Filed Dec. 12, 1923   5 Sheets-Sheet 4

Inventor

Edward P. Bullard, Jr.

By Chamberlain & Newman
Attorneys

Nov. 6, 1928.  1,690,567
E. P. BULLARD, JR
POWER CHUCKING DEVICE
Filed Dec. 12, 1923   5 Sheets-Sheet 5
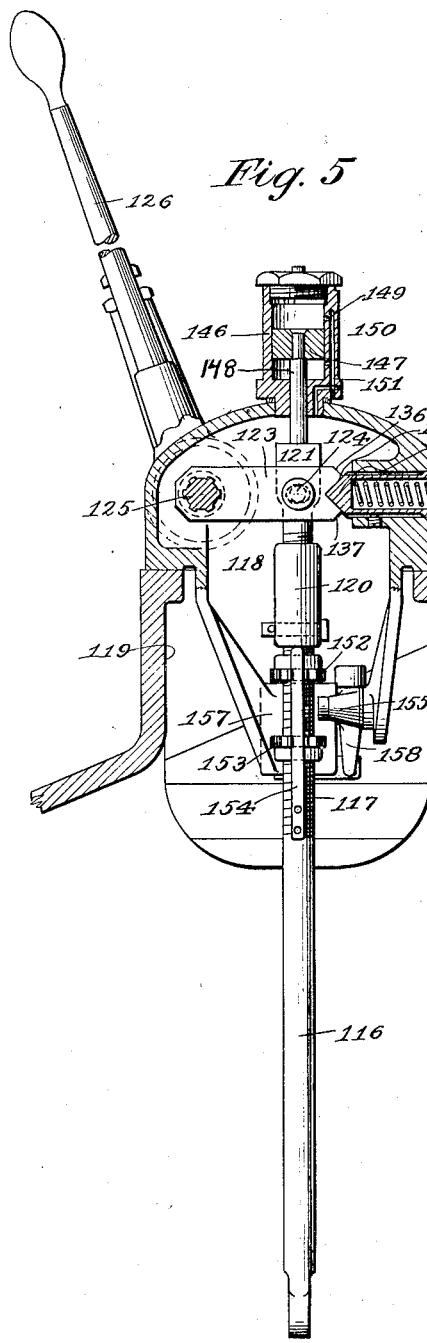
Inventor
Edward P. Bullard, Jr.
By Chamberlain & Newman
Attorneys Patented Nov. 6, 1928.

1,690,567

UNITED STATES PATENT OFFICE.

EDWARD P. BULLARD, JR., OF STRATFORD, CONNECTICUT, ASSIGNOR TO THE BULLARD MACHINE TOOL COMPANY, OF BRIDGEPORT, CONNECTICUT, A CORPORATION OF CONNECTICUT.

POWER CHUCKING DEVICE.

Application filed December 12, 1923. Serial No. 680,180.

This invention relates to a mechanical chucking mechanism, particularly for continuous multiple spindle turning machines, such machines being known in the trade as "Contin-U-Matics".

An object of the invention is to provide a chucking mechanism operated by the power of the machine, and which may be controlled with facility and precision. A further object is to provide a mechanism which will be positive in operation, and which will stop automatically as the chuck jaws reach the limits of their open or closed positions; and furthermore, to insure such stopping at all times, irrespective of any actions of the operator, as for instance, when he holds the operating lever in either opening or closing position, after the limit of such positions has been reached.

A still further object is to provide an improved driving mechanism for the rotating work holder, by means of which they will be automatically disconnected from the driving gear, and subsequently reengaged after first being initially rotated to attain a speed equal to the normal driving speed, so that the engagement with the driving gear will be practically noiseless, and without the danger of chipping or stripping the teeth.

With the above and other objects in view, an embodiment of the invention is shown in the accompanying drawings, and this embodiment will be hereinafter more fully described with reference thereto, and the invention will be finally pointed out in the claims.

In the drawings:

Fig. 3 is a vertical sectional view, the upper part of the machine being broken away, and the right-hand side being shown partially in elevation;

Fig. 5 is a vertical sectional view of the operating means taken along the line 5—5 of Fig. 4;

Fig. 6 is a horizontal sectional view, taken along the line 6—6 of Fig. 4;

Fig. 7 is a horizontal sectional plan view of the chuck operating gears, taken along the line 7—7 of Fig. 4;

Similar reference characters indicate corresponding parts throughout the several figures of the drawings.

The multiple spindle machine referred to herein as a "Contin-U-Matic", is a large capacity machine, which when operating on ordinary work can be handled by a single operator, whose principal duties are to stand in front of the machine, at the loading station, and to remove and replace the work upon the several rotary work tables as they come forward with the continuous rotation of the carrier, the rotation of the tables being automatically stopped as they approach the loading station. The rotation of the carrier is sufficiently slow to enable the operator to remove and replace the work as the tables move past the loading station.

With certain types of machines the operator has also heretofore operated the chuck jaws by means of a hand wrench, so as to first release the finished work, and then to grip the new piece, which operations necessarily consume time, add to the fatigue of the operator and thus reduce the efficiency of the machine. Such manual chucking is furthermore inconsistent with a machine having a continuously moving carrier, inasmuch as the operator must devote the greater part of the time, while the tables are moving in relation to the loading station, to removing the work and replacing the same. As will be apparent from the following description, the operator of the present machine is only required to throw a lever, to cause the chuck jaws to open or close, the actual operation of the jaws being carried out by mechanical means.

Figure 1:
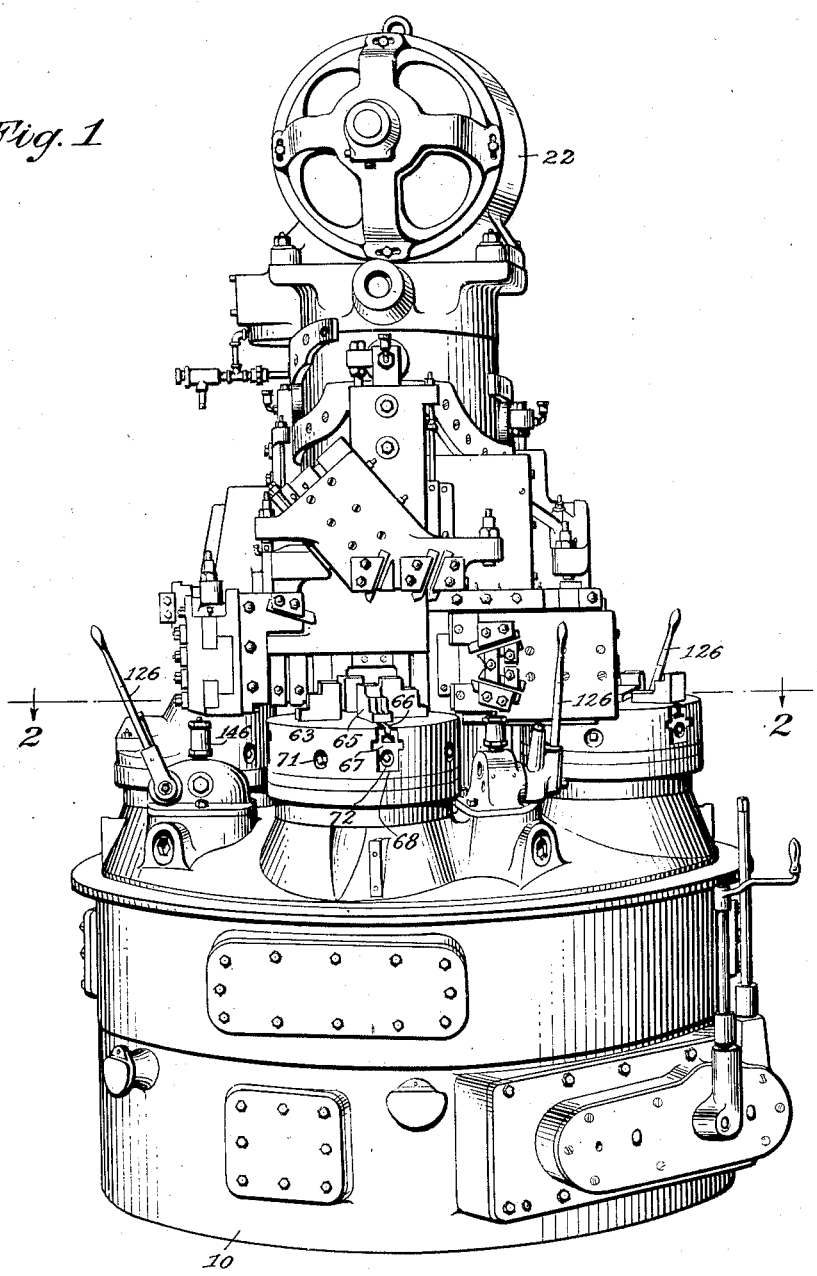
Fig. 1 is a perspective view from the forward side of a "Contin-U-Matic" machine, according to the present embodiment of the invention.
Figure 2:
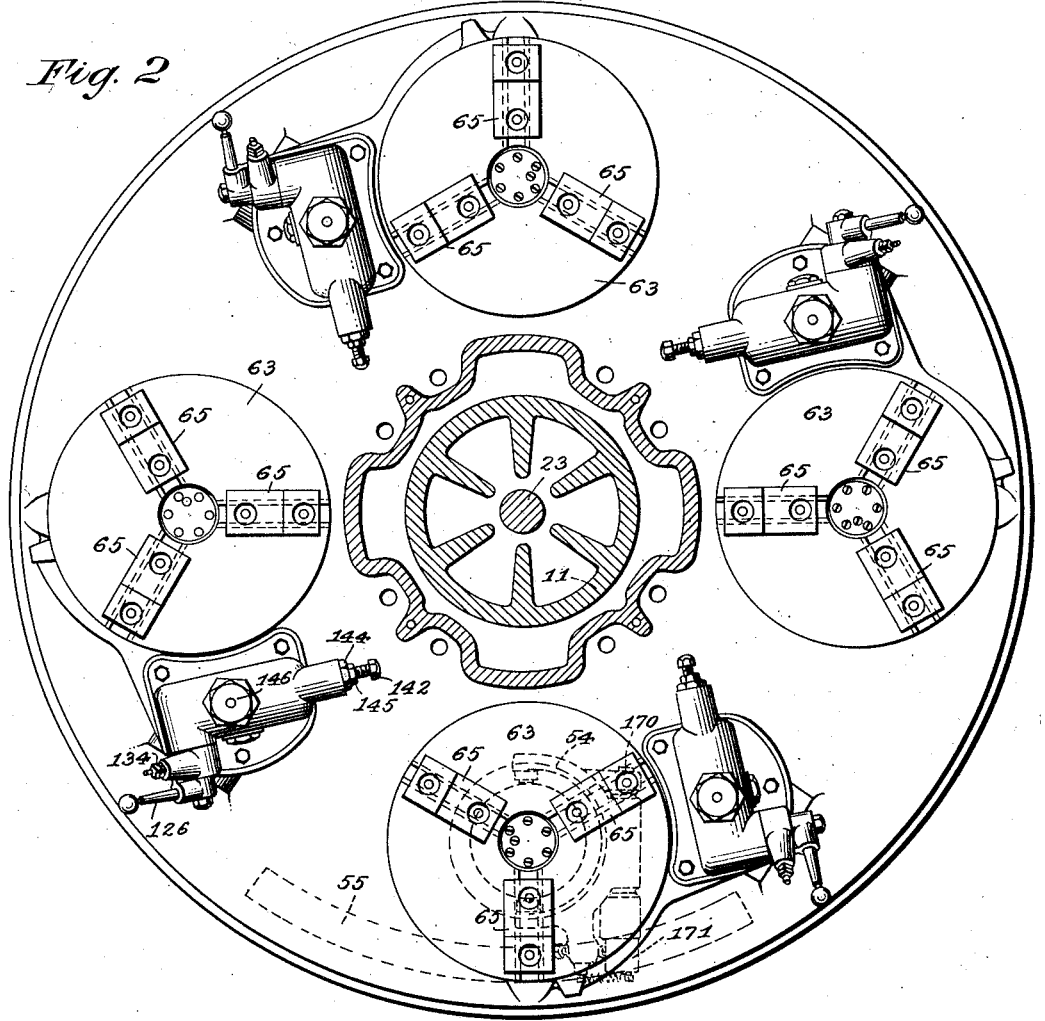
Fig. 2 is a plan view thereof, partially in section along the line 2—2 of Fig. 1.
Figure 8:
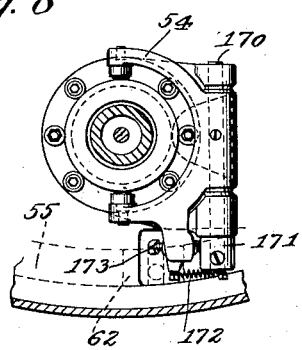
Fig. 8 is a plan view of the drive gear shifting lever.
Figure 9:
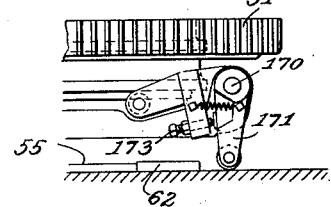
Fig. 9 is a side elevation thereof.

Referring particularly to Figs. 1 to 3 of the drawings, the machine comprises a stationary base 10 provided with a central hollow pedestal 11 bolted, as at 12, to an annular supporting flange 13 of the base, the base being also provided with an annular bearing ring 14 secured by bolts 15 to the outer peripheral wall 16 of the base. A rotatable turret carrier 17 for the plurality of radially disposed work carrying tables, surrounds the pedestal and rests upon a ball bearing support 18, being provided at its outer periphery with a depending flange 19 loosely engaging the annular bearing ring 14.

The carrier is provided at its lower side, within the base, with an annular worm gear 20, and is continuously driven by means of a motor driven worm 21 journaled in the base, the electric motor (not shown) for driving this worm being independent of the other driving parts of the machine, so that the speed of rotation of the carrier may be controlled independently of the speed of rotation of the work carrying tables.

Upon the upper end of the pedestal there is mounted an electric motor 22, which drives a vertical drive shaft 23 disposed centrally within the pedestal and journaled at its lower end in a thrust bearing 24 of the base. Adjacent the bearing 24 the shaft is provided with a pinion 25 meshing with and driving a gear 26 provided upon a vertical counter shaft 27, journaled in bearings 28 and 29 of the base and pedestal respectively. A pinion 30 is provided at the upper end of the shaft 27, which meshes with the internal teeth 31 of a ring gear 32, rotatably mounted in a bearing portion 33 of the pedestal, the external teeth 34 of the ring gear adapted to turn the work carrying tables, as will presently be more fully described.

The ring gear 32 also carries an auxiliary ring gear 35, the teeth of which are disposed above and in spaced relation to the external teeth 34, said gear 35 being adapted, as will be hereinafter more fully described, to drive the work carrying tables prior to their intermittent connection with the gear 32 at a speed equal to their normal speed, so that the connection with the gear 32 may be effected with facility and without danger of stripping the teeth.

The work carrying tables (four in the present embodiment) are rotatably supported in upper and lower bearings 36 and 37 secured in openings 38 and 39 of the carrier, and inasmuch as they are of indentical construction and operation, only one will be described in detail. It comprises a vertical tubular spindle 40 provided at its upper end with a central conical portion 41 engaging a conical seat 42 of the bearing 36, and an annularly grooved flange 43 rotatably engaging a ribbed portion 44 of the bearing 36.

The spindle is provided below the bearing 36 with a brake drum 45 secured against a shoulder 46 by means of a retaining ring 47 screwed upon the spindle, the ring projecting outwardly beyond a downwardly depending flange 48 at the inner periphery of the drum, to form an annular recess, within which a loose idler gear 49 is mounted, and which meshes with the ring gear 35, to be continuously driven thereby. An internal expanding brake band 50 is provided within the brake drum, and is adapted to be operated as the work table approaches and leaves the work removing and replacing station, by mechanism hereinafter more fully referred to.

Figure 4:
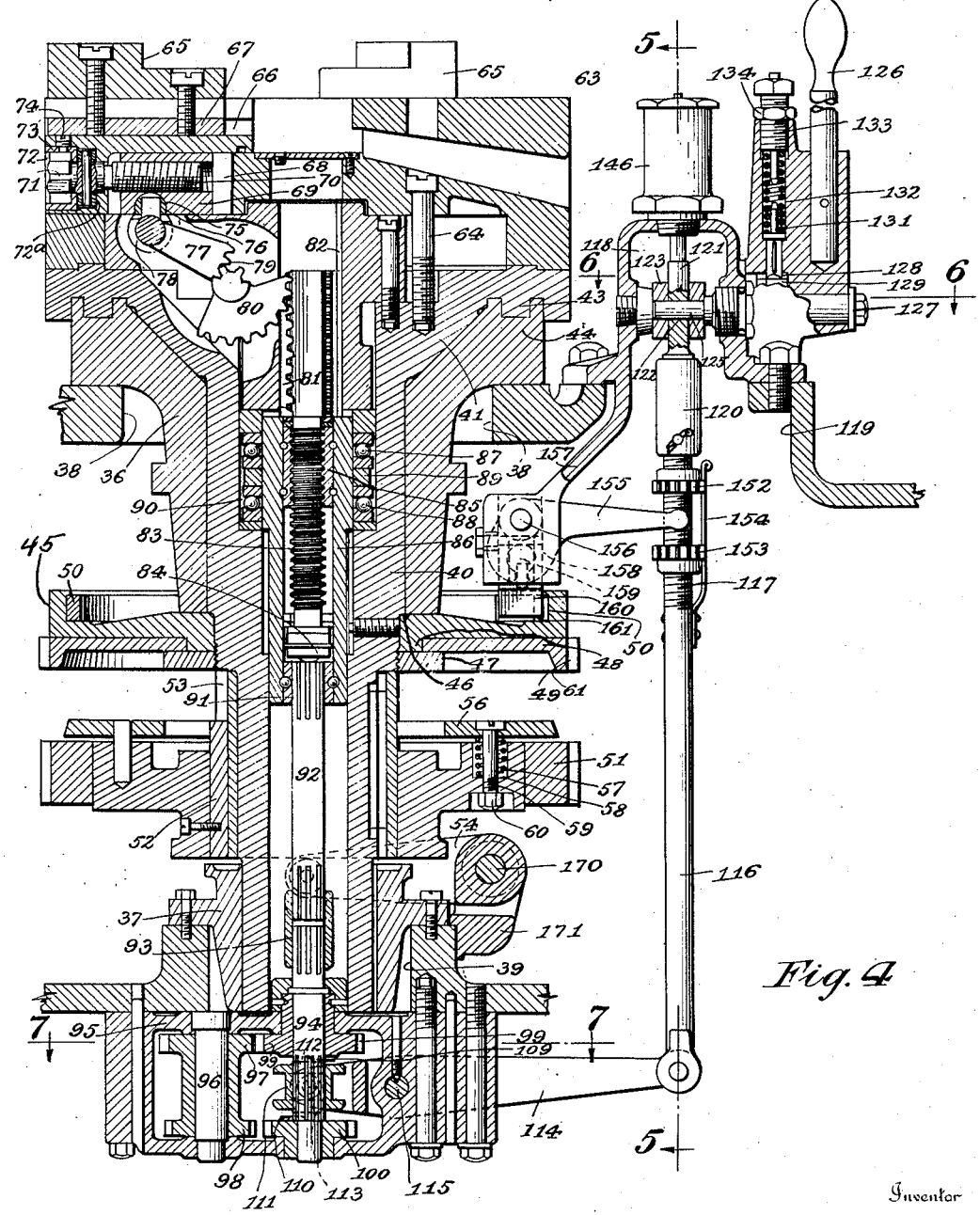
Fig. 4 is a vertical sectional view of the chuck opening and closing mechanism, and the operating means therefore.

Beneath the brake drum the spindle is provided with a gear 51 keyed thereto for vertical sliding movement by means of a key 52 engaging a key slot 53, said gear normally meshing with the external teeth 34 of the gear 32, in the position shown in Fig. 4, and adapted as the work table approaches the operator's station to be raised out of mesh with said gear 32, as shown in Fig. 3. The mechanism for raising and lowering the gear 51 consists of a lever 54 pivotally mounted on a shaft 170, and having rollered yoke arms engaging the lower side of the gear, a rollered arm 171 being also mounted on said shaft and connected to the lever by a spring 172, a set screw 173 in the lever bearing upon the arm and adapted to adjust the relation between them. The rollered arm is adapted as the carrier rotates to engage a cam 55 upon the bearing ring 14, thereby raising the gear to non-meshing position as the work table approaches the loading station, and lowering it as it leaves.

Upon the upper side of the gear 51 there is provided a beveled edge clutch plate 56 yieldably supported upon springs 57 disposed in pockets 58 of the gear, and surrounding plunger rods 59, limited in their upward movement by nuts 60. In the raised position of the gear 51, the rotation of the table being stopped, the clutch plate is disposed within a beveled walled recess 61 in the under side of the continuously rotating idler gear 49, but in non-engaging relation. Prior to the remeshing of the gear 51 with the driving gear 32, said gear 51 is raised relatively to the non-meshing position shown in Fig. 3, by means of a rise 62 at the end of the cam 55, and thereby engages the clutch plate with the gear 49, causing the gear 51 and the work table spindle to be rotated at a speed equal to its normal working speed, whereupon the cam lowers the gear 51 into mesh with the gear 32. Any danger of chipping or stripping the teeth of the gears is thus entirely eliminated.

At the upper end of the spindle 40 there is mounted the work carrying table 63, secured thereto by bolts 64, and provided with radial chuck jaws 65, adjustably secured in the T-slots 66 of chuck slides 67 movable outwardly and inwardly in slideways 68 of the table. A nut 69 is secured to the underside of each slide, and may be adjusted longitudinally with respect thereto by means of a screw 70 engaging the nut, and having an exposed squared head 71 disposed in a pocket 72 of the slide, the screw being fixed against longitudinal movement by means of a ring 72ª secured thereto, and engaged within the pocket, and a retaining cup-shaped member 73 secured within the pocket by set-screws 74.

The nut is provided at its under side with a cylindrical recess 75, having a recessed rotatable bearing 76 therein engaged by the short arm of a bell-crank lever 77, provided with trunnions 78 having bearing in the table, the long arm of said lever being provided at its end with teeth 79 meshing with the short radius portion of a combination toothed segment 80, also having bearing in the table. The long radius portion of the segment meshes with a vertically reciprocating rack 81 disposed in the spindle, this rack being of triangular shape to simultaneously operate the several chuck jaws, and being held against rotation relatively to the table by means of a key 82.

The rack is provided with a downwardly extending threaded shank 83 provided at its lower end with a thrust bearing 84, and engaged by a nut 85 secured within a rotating sleeve 86, having bearing within the spindle between anti-friction ball-bearings 87 and 88, disposed above and below a flange 89 of the sleeve, and supported within a recessed portion 90 of the spindle.

The sleeve extends below the threaded shank 83 and is coupled, as at 91, to the upper end of a shaft 92, extending downwardly through the spindle, and which in turn is splined, as at 93, to a shaft 94, rotatably supported within a bracket or cage 95 bolted to the carrier beneath the lower end of the spindle.

The cage is provided at one side of the shaft 94 with a vertical shaft 96, upon which are mounted integrally connected upper and lower gears 97 and 98, the lower of which is of smaller diameter, while upon the shaft 94 there are provided spaced idler gears 99 and 100 corresponding in size to the gears 97 and 98, the upper gears 97 and 99 being in mesh with each other. The lower gears 98 and 100 are in mesh with an internally toothed ring gear 101 (Figs. 3 and 7) supported for independent rotation within a recess 102 of the carrier driving worm gear 20 by means of a retaining ring 103. The ring gear 101 is furthermore provided at its under side with beveled teeth 104, and is driven by a beveled pinion 105 provided upon the end of a shaft 106 journaled in the base 10, and driven by worm gearing 107 from an electric motor 108. It will thus be seen that the gears 98 and 100 are continuously driven during the operation of the machine, and that the gear 99 is driven through the intermediate gear 97 in an opposite direction to the gear 100.

The gears 99 and 100 are provided upon each of their opposed faces with single clutch teeth 109 and 110, having beveled ends, and between these gears the shaft 94 is provided with a flanged clutch collar 111 splined thereto and having vertical movement on the shaft, said collar being provided upon its upper and lower faces with single clutch teeth 112 and 113 having beveled ends, and adapted to be raised and lowered by mechanism to be presently described, from its normal non-engaging or neutral position into engagement with either of the respective gears 99 and 100, to thereby form a driving connection between either of the gears and the shaft 94.

It is obvious that upon engagement of the clutch collar with one or the other gears 99 and 100, the shaft 94 and the nut 85 connected therewith will be rotated in one or the other directions, and that the rack 81 will be reciprocated either upwardly or downwardly, moving the chuck jaws, through the segment 80 and bell-crank lever 77, into open or closed position. As the clutch jaws reach the limit of their movement, further movement of the rack and rotation of the nut, shaft 94 and clutch collar is prevented, so that the continued rotation of the gear engaged by the clutch collar causes the latter to be cammed to its neutral or non-meshing position, through the action of the beveled end surfaces of the clutch teeth. In order to prevent the clutch collar, after it has been disengaged from one gear, from moving into engagement with the other, and thereby causing a continued opening and closing of the chuck jaws, a dash-pot movement-retarding mechanism, hereinafter more fully referred to, is connected to the clutch collar operating mechanism and effectually stops the collar from moving beyond its neutral position.

The clutch collar is engaged by the rollered yoke end of a lever 114 pivotally mounted at 115 in the cage 95, and having its projected end connected to a vertical operating shaft 116. The shaft 116 is threaded at its upper end, as at 117, and extends into a casing 118 secured by bolts within an opening 119 of the carrier, at one side of the work carrying table, said threaded end 117 being adjustably connected by a cotter-pinned coupling 120 to a vertical extension 121, having a slot 122 therein, and to which a forked lever arm 123 is connected by means of a pin 124. The lever arm is splined upon a horizontal shaft 125, journaled in the casing, and upon one end thereof an operating handle 126 is rotatably secured by means of a nut and washer 127, said handle being operatively connected to the shaft, to impart rotary movement thereto, by means of a pawl 128, having a V-shaped engaging end normally engaged in a notch 129 provided in a flange 130 of the shaft. The pawl is normally pressed into engagement with said notch by means of a spring 131 disposed in a passage 132 provided in the handle, and adjustable as to pressure by means of a pressure screw 133, adapted to be fixed in adjusted position by means of a lock nut 134.

The swinging end of the lever arm 123 is provided with a V-shaped notch 135 and beveled surfaces 136 and 137 above and below said notch, and is engaged by the V-shaped end 138 of a spring-pressed detent 139 slidably mounted in a tubular boss 140 formed in the casing. A spring 141 normally exerts an outward pressure on the detent and may be adjusted as to pressure by means of a pressure screw 142 bearing upon a cap member 143 engaging the inner end of the spring, said screw working through a cap screw 144 and adapted to be fixed in adjusted position by means of a lock nut 145.

The pressure of the spring 131 is greater than that of the spring 141, so that upon movement of the handle from its neutral or intermediate position to its operative position in either direction to open or close the chuck jaws, the detent will be pressed inwardly releasing the lever arm 123. The pressure of the spring 131 is such, however, as to permit depression of the pawl 128, and independent movement of the shaft 125 and lever arm 123, in the event that the operator does not release his hand from the handle prior to the automatic return of the shaft 116 to neutral position.

The detent 139, in addition to yieldably retaining the lever arm 123 in either its neutral or moved operative positions, also acts to move it and its associated mechanism with a quick snap action to its neutral or operative positions after a preliminary imparted movement, this snap action occurring at the moment the point of the detent passes the pointed ends of the notch 135.

In order to prevent any return movement, beyond the neutral position, which would result in successive opening and closing of the chuck jaws, as above referred to, a dash-pot mechanism acting in the nature of a brake is provided. This consists of a dash-pot 146 mounted upon the upper end of the casing 118, and provided with a plunger 147 connected by a plunger rod 148 to the member 121 at the upper end of the shaft 116, ports 149 and 150 being provided in the cylindrical wall of the dash-pot above and below the plunger and in communication with the interior of the casing 118 through a passage 151. This arrangement of the ports prevents particles of metal produced by the machining operations on the work from entering the chamber of the dash-pot. As the plunger is moved to its upper or lower position, upon movement of the operating mechanism to open or close the chuck jaws, one of the ports 149 and 150 is closed, so that upon the return to neutral position a vacuum is produced behind the plunger, and its movement is therefore retarded.

It will be understood that the operator throws the handle 126 to open and close the chuck jaws just after the work carrying table is automatically released from the drive gear 32 through lifting of the gear 52, and just prior to the reengagement, having in the meantime removed the finished work and replaced another piece to be worked upon. In order to stop the rotation of the work table the brake band is adapted to be simultaneously applied with the chuck jaw opening and closing operations, and released as the operating mechanism assumes its neutral position. For this purpose, the threaded portion 117 of the shaft 116 is provided with a pair of spaced nuts 152 and 153, having their peripheries notched, and adapted to be fixed in adjusted position by a leaf-spring retainer 154 secured to the shaft, and engaging one of the notches of each nut. A bell crank lever 155 pivotally mounted at 156 upon a bracket 157, has one arm extended into the space between said nuts, while its other arm is forked, as at 158, and embraces a laterally extending arm 159 of a vertically disposed pin 160 journaled in the bracket, and having a flattened end portion 161, in the nature of an expander key, disposed between the ends of the brake band 50, so that upon its being turned through movement of the bell crank lever, it will expand the band into braking engagement with the drum. In operation, the movement of the shaft 116 in either direction to open or close the chuck jaws will cause one or the other of the nuts to engage and rock the bell crank lever, thereby turning the pin and applying the brake, while the normal tendency of the brake band to contract will cause the pin and lever to resume their neutral or non-braking positions, as the shaft 116 moves into neutral position, at the completion of the chucking operation.

I have described and illustrated a preferred and satisfactory embodiment of the invention, but it will be obvious that changes may be made therein, within the spirit and scope thereof, as defined in the appended claims.

Having thus described the invention, what I claim and desire to secure by Letters Patent is:

1. A multiple spindle machine, comprising a rotatable carrier, rotary work tables mounted thereon, chuck jaws on said rotary tables, a plurality of continuously driven chuck operating means mounted on said carrier individual to each work table and movable with said carrier co-axial with each of said respective work tables, and clutch means mounted on said carrier for each of said operating means adapted to be actuated at any point in the rotation of the carrier to connect said operating means to operate the respective chuck jaws.

2. A multiple spindle machine, comprising a rotatable carrier, rotary work tables mounted thereon, chuck jaws on said rotary tables, means operable in forward and reverse directions to open and close said chuck jaws, a plurality of continuously driven operating means mounted on said carrier individual to each work table and movable with said carrier co-axial with each of said respective work tables operable in forward and reverse directions, and clutch means mounted on said carrier for each of said operating means adapted to be operated at any point in the rotation of the carrier to connect said operating means to said continuously driven means to operate in one or the other directions to open or close the respective chuck jaws.

3. A multiple spindle machine, comprising a rotatable carrier, means for rotating said carrier, rotary work tables mounted thereon, chuck jaws on the rotary tables, a plurality of chuck operating means mounted on said carrier individual to each work table and movable with said carrier co-axial with each of said respective work tables, and means mounted on said carrier for each of said operating means also coaxial with said respective work tables adapted to be actuated at any point in the rotation of the carrier to connect said operating means to operate the respective chuck jaws.

4. A multiple spindle machine, comprising a carrier, means for rotating said carrier, rotary work tables mounted thereon, chuck jaws on the rotary tables, chuck operating means for each table, means mounted on the carrier for each of said chuck operating means for operatively connecting said operating means at any point in the rotation of the carrier to operate said respective chuck jaws, and means for continuously driving said chuck operating means.

5. A multiple spindle machine, comprising a carrier, means for rotating said carrier, rotary work tables mounted thereon, chuck jaws on the rotary tables, chuck operating means for each table, a plurality of manually actuated means mounted on the carrier individual to each table for operatively connecting said operating means at any point in the rotation of the carrier to operate said chuck jaws, and means for continuously driving said respective chuck operating means.

6. A multiple spindle machine, comprising a carrier, means for rotating said carrier, rotary work tables mounted thereon, chuck jaws on the rotary tables, chuck operating means for each table including continuously driven gear means, means for operatively connecting said gear means to operate said chuck jaws, and a continuously driven gear meshing with and continuously driving said gear means of the several tables.

7. A multiple spindle machine, comprising a carrier, means for rotating said carrier, rotary work tables mounted thereon, chuck jaws on the rotary tables, chuck operating means for each table including continuously driven gear means rotating in forward and reverse directions, selective means for operatively connecting said gear means to operate said chuck jaws in forward or reverse directions, and a continuously driven gear meshing with and continuously driving said gear means of the several tables.

8. A multiple spindle machine, comprising a carrier, means for rotating said carrier, rotary work tables mounted thereon, means for rotating said tables, means adapted to disconnect said work table driving means at a predetermined point of the rotation of the carrier, and adapted to connect the same after a predetermined interval constituting a work removing and replacing interval, chuck jaws on the rotary tables, chuck operating means for each table, and a plurality of means mounted on the carrier individual for operatively connecting said operating means to operate said respective chuck jaws during said interval and at any point in the rotation of the carrier.

9. A multiple spindle machine, comprising a carrier, means for rotating said carrier, rotary work tables mounted thereon, means for rotating said tables, means adapted to disconnect said work table driving means at a predetermined point of the rotation of the carrier, and adapted to connect the same after a predetermined interval constituting a work removing and replacing interval, chuck jaws on the rotary tables, chuck operating means for each table, a plurality of means mounted on the carrier individual to each other for operatively connecting said operating means to operate said respective chuck jaws during said interval and at any point in the rotation of the carrier, and means for continuously driving said chuck operating means.

10. A multiple spindle machine, comprising a carrier, means for rotating said carrier, rotary work tables mounted thereon, means for rotating said tables, means adapted to disconnect said work table driving means at a predetermined point of the rotation of the carrier, and adapted to connect the same after a predetermined interval constituting a work removing and replacing interval, forward and reverse chuck operating means for each table adapted to open and close said chuck jaws, a plurality of manually actuated means mounted on the carrier individual to each table for operatively and selectively connecting said forward and reverse chuck operating means to open and close said respective chuck jaws during said interval and at any point in the rotation of the carrier, and means for continuously driving said chuck operating means.

11. A multiple spindle machine, comprising a carrier, a ring gear on said carrier, a driving pinion meshing with said ring gear and adapted to continuously drive said carrier, chuck jaws on the rotary tables, chuck operating means for each table including continuously driven gear means, means for operatively connecting said gear means to operate said chuck jaws, a ring gear rotatably mounted on said carrier and meshing with said gear means of the several tables, and means for continuously driving said last mentioned ring gear independently of the rotation of the carrier.

12. In a chucking device, a rotatable work carrying table, a spindle for said table fixed against longitudinal movement, chuck jaws carried by said table, means adapted to be moved in one or the other directions to open and close said chuck jaws, and brake means for said spindle adapted to be actuated through the movement of said last named means.

13. In a chucking device, a rotatable work carrying table, chuck jaws carried by said table, means adapted to be moved in one or the other directions to open and close said chuck jaws, brake means for said table including a circumferential brake drum, a brake band, means adapted to be moved in one or the other directions to cause said brake band to grippingly engage said drum, and means carried by said chuck operating means adapted to actuate said last named means in one or the other directions as said shuck operating means is actuated in one or the other directions.

14. In a chucking device, a rotatable work carrying table, chuck jaws carried by said table, means adapted to be moved in one or the other directions to open and close said chuck jaws, brake means for said table including a circumferential brake drum, a brake band, a lever adapted to be moved in one or the other directions to cause said brake band to grippingly engage said drum, and means carried by said chuck operating means adapted to actuate said lever in one or the other directions as said chuck operating means is actuated in one or the other directions.

15. In a chucking device, a rotatable work carrying table, chuck jaws carried by said table, means adapted to be moved in one or the other directions to open and close said chuck jaws, brake means for said table including a circumferential brake band, an internal expanding brake band, means adapted to be moved in one or the other directions to cause said brake band to grippingly engage said drum, and means carried by said chuck operating means adapted to actuate said last named means in one or the other directions as said chuck operating means is actuated in one or the other directions, said brake band adapted to return said last named means to normal non-braking position upon return of said chuck operating means to normal position.

16. In a chucking device, a rotatable work carrying table, chuck jaws carried by said table, means adapted to be moved in one or the other directions to open and close said chuck jaws, brake means for said table including a circumferential brake drum, a brake band, means adapted to be moved in one or the other directions to cause said brake band to grippingly engage said brake drum, and spaced adjustable means carried by said chuck operating means adapted to actuate said last named means in one or the other directions as said chuck operating means is actuated in one or the other directions.

17. A multiple spindle machine, comprising a rotatable carrier, rotary work tables mounted thereon, means for rotating said tables, means for disconnecting said tables from said rotating means during a predetermined period of the rotation of the carrier, chuck jaws carried by said tables, means adapted to be moved in one or the other directions to open and close said chuck jaws during said predetermined period, and brake means for said tables adapted to be actuated through the movement of said last named means.

18. A multiple spindle machine, comprising a rotatable carrier, rotary work tables mounted thereon, a driving gear for said work tables, gears slidably keyed to said tables and normally meshing with said driving gear to be driven thereby, and means adapted to disengage said gears from said driving gear at a given point in the rotation of said carrier and to reengage the same after a given period.

19. A multiple spindle machine, comprising a rotatable carrier, rotary work tables mounted thereon, a driving gear for said work tables, gears slidably keyed to said tables and normally meshing with said driving gear to be driven thereby, means adapted to disengage said gears from said driving gear at a given point in the rotation of said carrier and to reengage the same after a given period, and auxiliary drive means for said tables adapted to be actuated before reengagement of said gears to impart a preliminary rotation to said tables substantially equal to their normal speed of rotation.

20. A multiple spindle machine, comprising a rotatable carrier, rotary work tables mounted thereon, a driving gear for said work tables, gears slidably keyed to said tables and normally meshing with said driving gear to be driven thereby, auxiliary drive means for said tables normally out of driving relation therewith, means adapted to disengage said gears from said driving gear at a given point in the rotation of said carrier and to reengage the same after a given period, and means adapted to be actuated before said reengagement to form a frictional driving connection between said auxiliary drive means and said tables to impart a preliminary rotation to said tables substantially equal to its normal speed of rotation.

21. A multiple spindle machine, comprising a rotatable carrier, rotary work tables mounted thereon, a driving gear for said work tables, gears slidably keyed to said tables and normally meshing with said driving gear to be driven thereby, an auxiliary drive gear, an idler gear on each table in constant mesh therewith to be continuously driven thereby, means adapted to disengage said slidably keyed gears from said driving gear at a given point in the rotation of said carrier and to reengage the same after a given period, and means adapted to be actuated before said reengagement to connect said tables to said idler gears to impart a preliminary rotation to said tables substantially equal to the normal speed of rotation.

22. A multiple spindle machine, comprising a rotatable carrier, rotary work tables mounted thereon, a driving gear for said work tables, gears slidably keyed to said tables and normally meshing with said driving gear to be driven thereby, an auxiliary drive gear, an idler gear on each table in constant mesh therewith to be continuously driven thereby, a friction clutch between said slidably keyed gears and said idler gears, and cam means adapted to disengage said slidably keyed gears from said driving gear at a given point in the rotation of said carrier, to reengage the same after a given period, and to actuate said friction clutch to connect said slidably keyed gears and said idler gears before said reengagement to impart a preliminary rotation to said slidably keyed gears substantially equal to the normal speed of rotation.

23. A multiple spindle machine, comprising a rotatable carrier, rotary work tables mounted thereon, chuck jaws carried by said tables, means for rotating said tables, means for disconnecting said tables from said rotating means during a predetermined period of the rotation of the carrier, and a plurality of means mounted on the carrier individual to each table adapted to be actuated to open and close said respective chuck jaws during said predetermined period and at any point in the rotation of the carrier.

Signed at Bridgeport, in the county of Fairfield and State of Connecticut this 10th day of December, A. D., 1923.

EDWARD P. BULLARD, Jr.